United States Patent [19]

Arai et al.

[11] 4,229,239

[45] Oct. 21, 1980

[54] TRANSFER PRINTING METHOD

[75] Inventors: Eisuke Arai, Koganei; Kuniaki Kamei, Kodaira; Akio Kawasaki, Urawa; Fumio Takagi; Koichi Shirai, both of Tokyo; Yasuharu Orihara, Urawa, all of Japan

[73] Assignee: Dai Nippon Insatsu Kabushiki Kaisha, Tokyo, Japan

[21] Appl. No.: 924,853

[22] Filed: Jul. 17, 1978

[30] Foreign Application Priority Data

| | | | |
|---|---|---|---|
| Jul. 27, 1977 | [JP] | Japan | 52-90049 |
| Aug. 17, 1977 | [JP] | Japan | 52-98482 |
| Aug. 25, 1977 | [JP] | Japan | 52-102007 |
| Jan. 24, 1978 | [JP] | Japan | 53-6317 |

[51] Int. Cl.² .......................... B32B 31/12; B44C 1/16

[52] U.S. Cl. .................................... 156/155; 156/230; 156/235; 156/236; 156/238; 156/277; 427/149; 427/280; 427/430.1; 428/914

[58] Field of Search ................ 8/2.5 R; 156/155, 212, 156/230, 235, 236, 238, 246, 277; 427/149, 280, 430 R; 428/914

[56] References Cited

U.S. PATENT DOCUMENTS

| | | | |
|---|---|---|---|
| 4,010,057 | 3/1977 | Nakanishi | 156/230 X |
| 4,105,483 | 8/1978 | Lin | 156/154 |

*Primary Examiner*—John T. Goolkasian
*Assistant Examiner*—Robert A. Dawson
*Attorney, Agent, or Firm*—Koda and Androlia

[57] ABSTRACT

A printing pattern support sheet made up of a film soluble in water and a pattern pre-printed on one surface of the film is prepared beforehand. The pattern is activated, immediately before being used for transfer printing, into a tacky or adherent condition ready for printing by applying a solvent thereto. The sheet with the pattern thus activated is fed onto the free surface of a mass of water, whereby the film supporting the pattern is dissolved in the water to leave the pattern floating on the surface of the water. An article on the surface of which the pattern is to be printed is then forced against the floating pattern into the water, whereby the pattern is transferred and adheres to the article. To apply the solvent to the pattern, a gravure printing plate cylinder can be used.

16 Claims, 28 Drawing Figures

FIG. 22
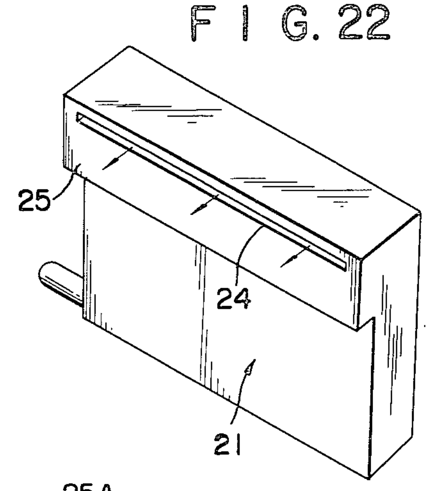
FIG. 23
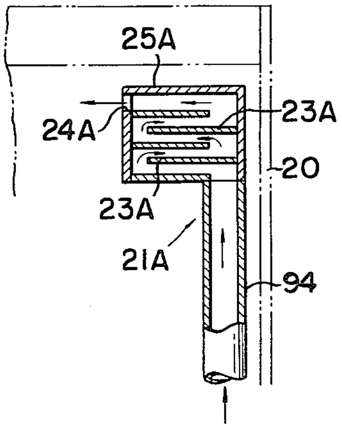
FIG. 24
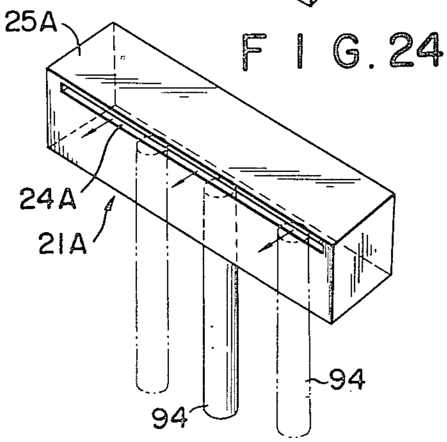
FIG. 26
FIG. 25
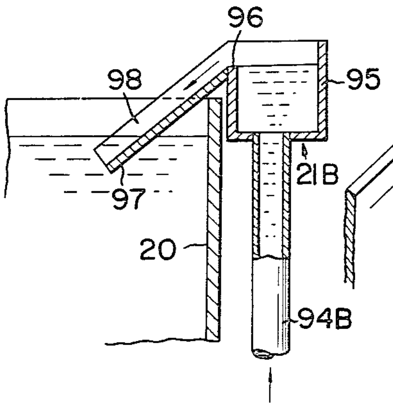
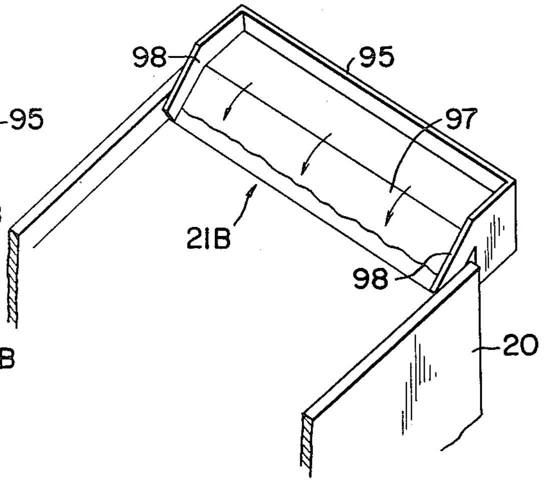

TRANSFER PRINTING METHOD

BACKGROUND OF THE INVENTION

This invention relates generally to printing and transfer printing and more particularly to a method of, and an apparatus for applying printing onto planar and non-planar surfaces such as curved surfaces and irregularly-shaped surfaces.

A curved surface printing apparatus comprising a liquid tank for storing a liquid such as water, for example, and a printing pattern support sheet feeding device for supplying onto the surface of the liquid in this liquid tank a printing pattern support sheet so that it will float thereon, this sheet comprising a thin film of a material soluble in the liquid and a pattern to be printed which is provided on the surface of the thin film is known, one example thereof being disclosed in U.S. Pat. No. 4,010,057 to Nakanishi, patented Mar. 1, 1977.

In this known printing apparatus, when the printing pattern support sheet contacts the liquid surface, its soluble thin film partially dissolves in the liquid to a degree necessary for transfer, and the pattern to be transfer printed floats on the liquid surface together with the partially dissolved thin film. Accordingly, when the surface to be printed of an article to be printed is lowered toward this pattern on the liquid surface and submerged into the liquid, the pattern adheres to the surface to be printed because of the liquid pressure. Therefore, by raising the article out from the liquid and washing off the thin film with the liquid, the transfer printing of the pattern is completed.

An advantageous feature of this printing apparatus is that it is capable of printing any pattern onto the article surface to be printed even when this surface is a non-planar surface such as a curved surface or an irregular surface, and this apparatus is suitable for printing of surfaces such as those of plastic clock cases, television receiver cabinets, and radio receiver cabinets or cases.

In the printing apparatus of this known kind, however, the ink constituting the pattern must not be in a dry state since the pattern floating on the liquid surface in the liquid tank must adhere promptly to the article surface at the instant when the surface of the article being printed contacts the pattern. For this reason, the printing of the pattern on the thin film must be carried out by a printing press immediately before the printing pattern support sheet reaches the liquid surface. In this known printing apparatus, therefore, the pattern printed on the thin film surface can be printed only once. As a consequence, only monochrome patterns could be obtained. The reason for this is that, in multistage printing with different colors for the purpose of obtaining a multicolor pattern immediately prior to the floating of the sheet on the liquid surface, printing with an ink of a color of a succeeding stage cannot be carried out until the printing ink of the color of the preceding stage has dried.

Moreover, in the printing apparatus of the above stated kind, the printing press for printing the pattern on the thin film must be operated to produce the printing pattern support sheet in a quantity corresponding to the speed of the transfer printing carried out in the liquid tank. However, the printing speed of the printing press is usually far greater than that of the transfer printing, so that the printing press must be operated intermittently in such a manner that the printing pattern support sheet reaches the surface of the liquid with fresh or wet pattern which has just been printed on the film. It is apparent that such intermittent control of the printing press is difficult to attain.

SUMMARY OF THE INVENTION

It is an object of this invention to provide a method of and apparatus for transfer printing by which multicolor printing can be carried out.

Another object of this invention is to provide a method of and apparatus for transfer printing wherein operational control can be carried out easily.

A further object of this invention is to provide a method of and apparatus for transfer printing wherein undesirable influence of disturbance of the floating printing pattern support sheet, which occurs when the article to be printed is lowered against the sheet, on the upstream part of the sheet can be completely prevented.

A still further object of this invention is to provide a method of and apparatus for transfer printing wherein curling of side edges of the printing pattern support sheet can be eliminated.

Still another object of this invention is to provide a method of and apparatus for transfer printing wherein formation of wrinkles on the printing pattern support sheet is precluded.

A further object of this invention is to provide an apparatus for transfer printing wherein adhering of a solvent for activating the printing pattern to parts other than the pattern is prevented.

A still further object of this invention is to provide a transfer printing apparatus having an effective liquid flow generating device.

According to this invention, in one aspect thereof, there is provided a method for transfer printing on an article comprising the steps of: preparing a printing pattern support sheet made up of a film soluble in a liquid and a pattern pre-printed on one surface of the film; applying a solvent to said pattern thereby to activate the pattern into an adherent condition ready for printing; feeding the sheet onto a free surface of a mass of said liquid, the film of the sheet thereby directly contacting and floating on the free surface, causing the film of the sheet to dissolve in the liquid to leave the pattern on the free surface of the liquid; and moving the article against the pattern on the free surface and into the liquid to transfer the pattern onto the article.

According to another aspect of this invention, there is further provided a transfer printing apparatus comprising: means forming a free surface of a liquid; liquid flow generating means for causing flow of the liquid in a direction on said free surface; means for feeding a printing pattern support sheet, made up of a film soluble in said liquid and a pre-printed pattern supported on one surface of said film, on said free liquid surface in said direction in a manner such that the sheet floats on the free liquid surface with the film directly contacting the surface and is moved in said direction with the liquid flow; and solvent applying means associated with said means for feeding the sheet to apply a solvent to said pattern, before the sheet reaches said free surface, to activate the pattern into an adherent condition ready for transfer printing, whereby as the sheet is moved on the free liquid surface, the film dissolves in the liquid to leave on the liquid surface the activated pattern against which an article can be forced to be printed with the pattern thereon.

The nature, utility, and further features of this invention will be more clearly apparent from the following detail description with respect to preferred embodiments of the invention when read in conjunction with the accompanying drawings, which are briefly described below, and in which like parts are designated by like reference numerals or characters.

BRIEF DESCRIPTION OF THE DRAWINGS

In the drawings:

FIG. 22 is a perspective view of a liquid flow generating device used in the device shown in FIGS. 2 and 3;

FIG. 23 is a vertical section of a modified liquid flow generating device;

FIG. 24 is a perspective view of the device illustrated in FIG. 23;

FIG. 25 is a vertical section of a further modified liquid flow generating device;

FIG. 26 is a perspective view of the device shown in FIG. 25;

DETAILED DESCRIPTION

Figure 1:
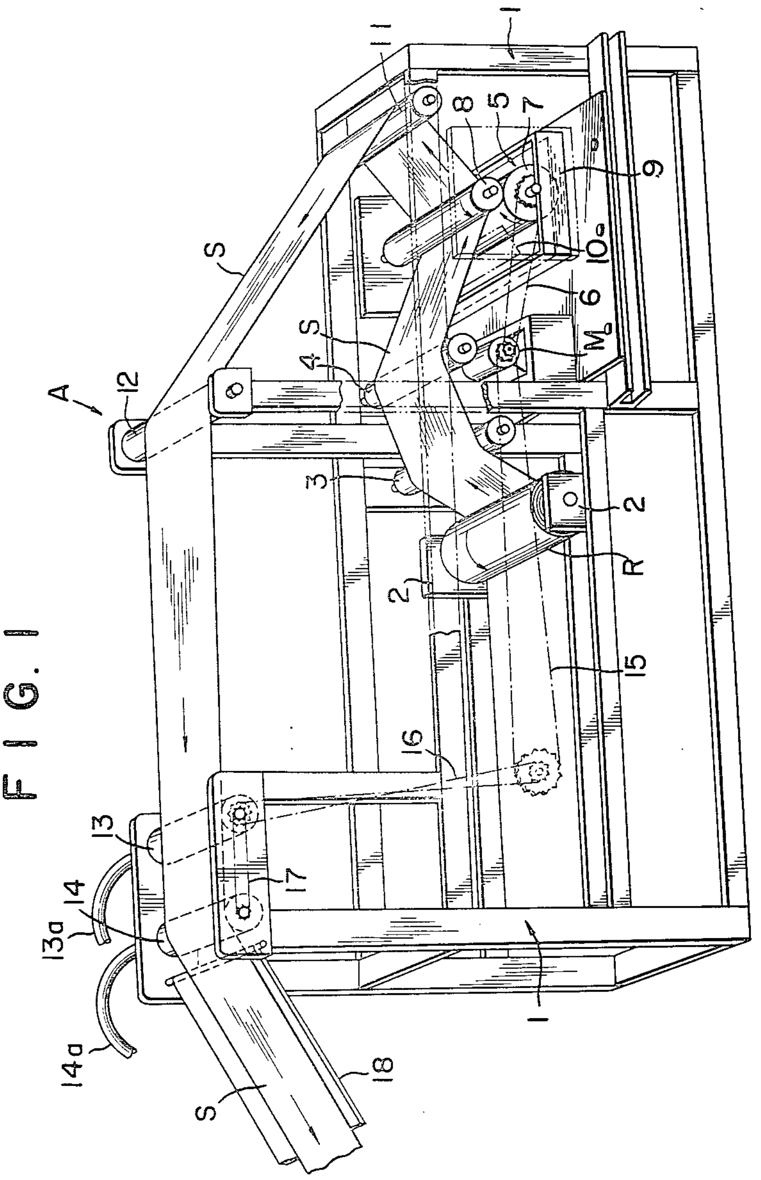
FIG. 1 is a perspective view, with some parts cut away, showing one example of a device for feeding a printing pattern support sheet of a transfer printing apparatus constituting one embodiment of this invention.
Figure 2:
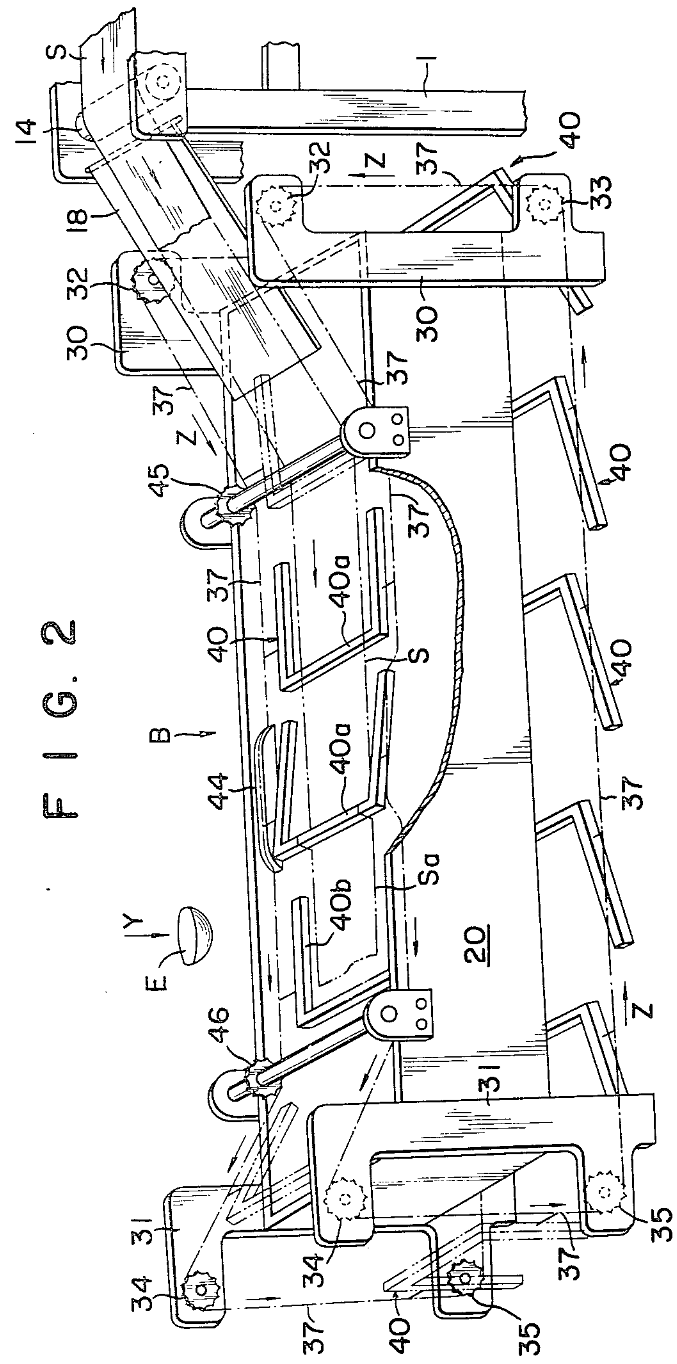
FIG. 2 is a perspective view, with some parts cut away, showing one example of a device for transferring patterns onto articles of the transfer printing apparatus.

The curved surface printing apparatus of this invention is made up of a device A for feeding a printing pattern support sheet (hereinafter referred to as sheet feeding device A) as shown in FIG. 1 and a device B for transferring patterns onto articles (hereinafter referred to as pattern transferring device B) as illustrated in FIG. 2.

The sheet feeding device A has a structural frame 1 which supports bearings 2 for detachably and rotatably supporting a roll R of a printing pattern support sheet S in the form of a strip. These bearings 2 constitute a storage device for the printing pattern support sheet.

The printing pattern support sheet S comprises, for example, a thin film of a water-soluble polyvinyl alcohol and a desired pattern printed beforehand on one surface thereof. In this case, while the pattern printed on the thin film may be a monochrome pattern, it is preferably a polychrome pattern.

The above mentioned roll R of the sheet S, is so woud that the printed surface of the sheet is exposed on the outer side. From this roll R, the sheet S is pulled out and passed over guide rolls 3 and 4 to a solvent coating device 5. This solvent coating device 5 comprises a liquid pan 9 for containing a solvent, a plate cylinder 7 rotatably supported so that its lower part is immersed in the solvent in the pan 9, the cylinder 7 being driven in rotation by a motor M through an endless chain 6, an impression cylinder 8 disposed above the cylinder 7 and adapted to press thereagainst over the sheet S interposed therebetween, and a doctor blade 10.

As the plate cylinder 7 rotates, the solvent from the liquid pan 9 clinging to surface of the cylinder 7 is leveled by the doctor blade 10 into a coating of uniform thickness and thus applied to the pattern printing surface of the sheet S passing between the plate cylinder 7 and the impression cylinder 8. As a consequence, the pigment and resin constituting the pattern printed on the surface of the sheet S are partially dissolved by the solvent to a degree which does not cause them to flow off, but which so activates the pigment and resin that they acquire tackiness similar to that immediately after printing.

The cylinder 7 may be used only for the purpose of applying the solvent, but it can also be used for applying a further gravure coat of another color on the pattern printed beforehand on the sheet S and, moreover, for activating the same. It will be noted that in this case the cylinder 7 functions as a printing cylinder. Furthermore, any other suitable coating device, such as a roll coating device, can be used for the solvent coating device 5.

The sheet S coated with the solvent in the above described manner and bearing the activated printed pattern further passes around and past an inverting roll 11 and a guide roll 12. After the sheet S passes arounded the inverting roll 11, the printed pattern of the sheet is disposed on the upper surface of the sheet.

The sheet S, after passing by the guide roll 12, is further fed by the rotation of suction rolls 13 and 14. The suction roll 13 is driven by the motor M via endless chains 15 and 16, and the suction roll 14 is driven by the suction roll 13 by way of an endless chain 17. The suction rolls 13 and 14, which are in the form of hollow cylinders, respectively have a large number of suction holes disposed around their cylindrical surfaces and communicating with the hollow interiors of the suction rolls, which are connected by pipe lines 13*a* and 14*a* to a vacuum pump (not shown). The sheet S is thus drawn by pressure difference against the suction rolls 13 and 14 as it is driven thereby. The suction rolls 13 and 14 are driven at a peripheral speed greater than that of the cylinder 7 to impart tension to the sheet S. From the suction roll 14, the sheet S is sent along a delivery plate 18, which is inclined downwardly in the direction of feed, and enters the aforementioned pattern transferring device B. It is to be noted that only one suction roll may be used instead of the two suction rolls 13 and 14.

Figure 3:
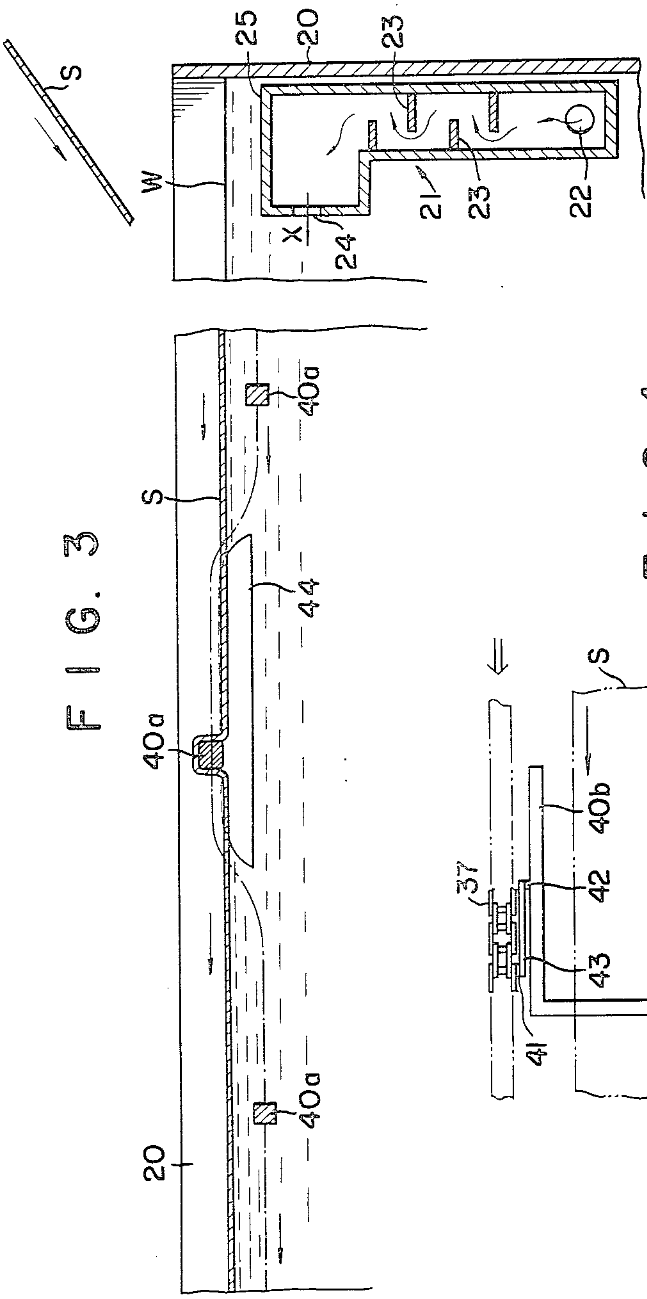
FIG. 3 is a relatively enlarged, fragmentary side elevation, in vertical section, showing portions of the pattern transferring device shown in FIG. 2.

As shown in FIG. 2, the pattern transferring device B has a water tank 20 containing water W (FIG. 3) therewithin. As shown in FIG. 3, a water flow generating device 21 is provided in this water tank 20 at its part nearest the sheet feeding device A or at the upstream part of the water tank 20. This water flow generating device 21 comprises essentially a box-like chamber 25 having at its lower part an inlet 22 connected to the delivery side of a pump (not shown) for pumping water flowing out of an overflow part (not shown) provided at the other (downstream) end of the water tank, a plurality of baffle plates or deflectors 23 within the chamber, and an outlet in the form of a slit 24 extending transversely across the water tank 20 at the upper part of the water W. Thus, the water entering the water flow generating device 21 through the inlet 22 is caused to flow out as a steady flow through the slit 24, whereby there is a continual water flow in the arrow direction X with minimal turbulence at the upper part of the water W in the water tank 20.

The printed pattern support sheet S descending along the above mentioned delivery plate 18 is fed onto the surface of the water W in the water tank 20 and, as it floats on the water surface, travels together with the flowing water. As the sheet S thus travels, the water-soluble thin film of polyvinyl alcohol or the like constituting the sheet S progressively dissolves in the water, swells, and assumes a partially dissolved state. At the same time, the printed pattern is caused to float on the water surface in a state wherein it is supported by this thin film in partially dissolved state. This state is attained when the sheet S reaches the position designated at Sa in FIG. 2.

Accordingly, when an article E having a non-flat surface such as a curved surface or an irregular surface is lowered in the arrow direction Y toward the printed pattern thus floating on the water surface at the position Sa and is pushed downward, the pattern adheres to the surface of the article E at the instant when it contacts the water surface and is pressed against the surface of the article by the action of the water pressure due to the immersion of the article in the water. Then, as a result of its adhesiveness, the activated printed pattern adheres to and is thus transferred to the surface of the article E. Finally, the article E is lifted out of the water and washed with water thereby to rinse off the thin film, whereupon the transfer is completed.

When the article is lowered toward the sheet S at the position Sa, the pattern floating on the surface of the water is pressed into the water. In conjunction with this action, the part of the sheet S where the water-soluble thin film is dissolved to only an insufficient degree is pulled toward the downstream direction, whereby the sheet floating on the water surface on the upstream side is disturbed and becomes disorderly. This disturbance of the sheet is undesirable since it gives rise to disturbance of the pattern.

In order to prevent such an occurrence in the illustrated embodiment of the invention, the means described below is provided. At the upstream and downstream ends of the water tank 20, left and right support members 30, 30 and left and right support members 31, 31 are respectively provided. Each of the upstream support members 30, 30 rotatably supports sprocket wheels 32 and 33 at its upper and lower ends, respectively, while each of the downstream support members 31, 31 rotatably supports sprocket wheels 34 and 35 at its upper and lower ends, respectively. An endless chain 37 is passed around the sprocket wheels 32, 34, 35, and 33 on each side of the water tank 20. At least one sprocket wheel on each side is coupled to a motor (not shown) and, functioning as driving sprocket wheel, drives the chain 37 in the direction indicated by the arrow Z.

Figure 4:
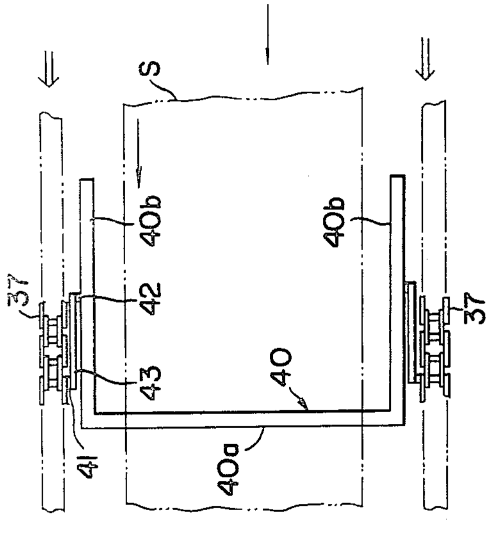
FIG. 4 is a relatively enlarged, fragmentary plan view of a sheet raising member and related parts of the pattern transferring device.

On one hand, as shown in FIG. 4, a plurality of raising members 40 for raising the printed pattern support sheet S are connected between the parallel left and right chains 37, 37 at equal intervals in the direction of chain travel. Each of these raising members 40 in the illustrated example comprises a transverse bar 40*a* and left and right lateral bars 40*b*, 40*b* respectively joined at their downstream ends perpendicularly to the left and right ends of the transverse bar 40*a*. The left and right lateral bars 40*b*, 40*b* of each raising member 40 are respectively coupled to the left and right chains 37, 37 by respective coupling members. Each coupling member in the instant example comprises a link bar 43 connected at one end thereof by a pin 41 to the corresponding chain 37 and at the other end thereof by a pin 42 to the corresponding lateral bar 40*b* at a point intermediate between its two ends. In the construction of the raising member 40, the lateral bars 40*b* are not absolutely necessary since the raising action is carried out by the transverse bar 40*a* as described hereinafter.

Each of the above described chains 37, 37 is guided by upstream and downstream idler sprocket wheels 45 and 46 at the upper part of the water tank 20, as shown in FIG. 2, to travel along the inner side of the water tank in a substantially horizontal path in its span between these idler sprocket wheels 45 and 46. The height of this span of each chain 37 is so selected that the raising members 40 supported by the chain and thus traveling in the water flow direction will be submerged slightly below the surface of the water W. The purpose of this is to prevent the sheet S floating on the water surface from being disturbed by the advancing of the raising members 40.

On one hand, at an intermediate part of the horizontal travel path of the chains 37, 37 between the idler sprocket wheels 45 and 46, two raising cams 44 are respectively fixed to the inner sides of the left and right side walls of the water tank 20. These raising cams 44 are disposed at the water surface at positions which are a specific short distance upstream from the position Sa where the water-soluble thin film of the sheet S dissolves to a degree required for transfer and, as shown in FIG. 3, have shapes such that when the chains 37 pass by these cams 44, the chains 37 are raised somewhat. As a consequence, when each raising member 40 reaches the position of the cams 44, it is raised slightly above the water surface as indicated in FIG. 3, and, as a result, the sheet S is raised slightly above the water surface by the transverse bar 40*a* of the raising member 40. Then, when the raising member 40 passes beyond the region of the cams 44, it is again lowered to a position immersed in the water W.

When the sheet S is thus raised slightly, its water-soluble thin film has not yet dissolve to a degree required for transfer. For this reason, the sheet S still has the ability to maintain its shape and, therefore, is not caused by this raising action to assume a disorderly state.

When an article E is immersed into to the water W at the position Sa where the water-soluble thin film has dissolved to a degree required for transferring, any undesirable effect due to this immersion on the sheet S upstream from this position Sa is cut off at the position of the succeeding raising member 40 at the position of the cams 44 since a portion of the sheet S is being raised above the water surface by this raising member 40, whereby the undesirable effect is prevented from being propagated upstream. Since the raising members 40 are conveyed by the chains 37, 37 at a speed which will not give rise to wrinkling and other deformation of the sheet on the water surface and are continually submerged below the water surface, except at the cams 44, they do not disturb the sheet on the water surface.

While water is stored in the tank 20 in the above described embodiment of the invention, it is possible to use a liquid other than water. In such a case, the thin film of the sheet S is made of a material which is soluble in that liquid.

In accordance with this invention as described above, a printing pattern support sheet on which a pattern has been previously printed is stored in a storing device and from there caused to travel toward the surface of a liquid in a liquid tank. During this travel of the sheet, the sheet is coated with a solvent for dissolving the pattern on the pattern support sheet thereby to activate the material constituting the pattern, thereby to return this material to its state immediately after printing. Thus, adhesiveness is imparted to the pattern, whereby the desired transfer printing can be carried out. Furthermore, since a sheet which has been printed beforehand is used in this invention, multicolor printing can be carried out on the surface of an article by providing on the sheet a pattern previously printed in multiple colors.

Figure 5:
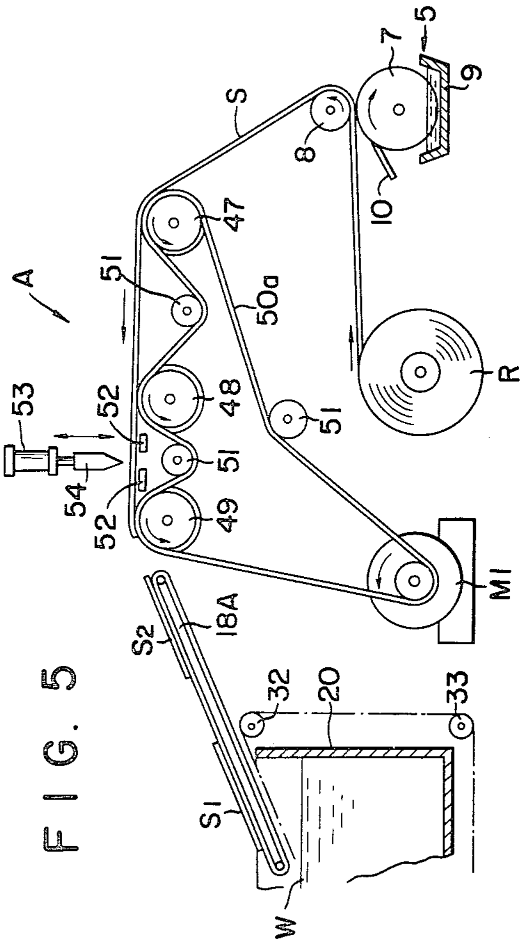
FIG. 5 is a schematic side elevation showing a modified device for feeding a printing pattern support sheet wherein the sheet is fed in the form of separate sheet elements.

In the embodiment of the invention described above, the printing pattern support sheet S is in the form of a strip, and the strip is fed continuously onto the surface of the water W in the tank 20. However, the sheet S may be fed in the form of separate sheet elements, or the device for feeding the printing pattern support sheet may be of a sheet-fed type as illustrated in FIG. 5.

In this figure, the same reference numerals as are used in FIGS. 1 through 4 designate the same elements and parts. The sheet S in the form of a strip is passed around the impression cylinder 8 as shown, and is fed forward by suction rolls 47, 48 and 49 toward the water tank 20 through a constantly driven delivery conveyor 18A. These suction rolls 47, 48 and 49 are rotated in the direction of arrows by a motor M1 by way of a transmission belt 50 passed around the suction rolls and tension rolls 51.

Between the suction rolls 48 and 49 there are provided a pair of horizontal, transverse suction bars 52 with a clearance therebetween, and the sheet is fed on and along the upper surfaces of these bars 52. A pneumatic cylinder 53 having a cutter blade 54 secured to the piston rod thereof is so positioned above these bars 52 that, as the cylinder 53 is operated in reciprocation, the cutter blade 54 is caused to move up and down into and out of the clearance between the bars 52 to cut the continuous sheet S into separate sheet elements S1, S2, .... The reciprocating movement of the cutter blade 54 is controlled in timed relationship with the feed of the sheet S. When the cutter blade 54 is moved downward to cut the sheet, the suction bars 52 are so operated that the interior spaces thereof are subjected to vacuum to attract and hold the sheet thereon, and the upstream part of the sheet is slackened between the suction rolls 47 and 48. The thus cut sheet elements S1, S2, ... are then fed successively onto the water surface, and substantially the same operation as was described hereinbefore is carried out in the tank 20 for the transfer printing.

It will be noted that since the printing pattern support sheet S is fed in the form of separate sheet elements according to this modified form, the aforementioned problem of disorderliness of the pattern on the sheet caused by a disturbing effect on the upstream part of the sheet due to lowering of the article against the sheet for transfer printing can be completely eliminated.

The undesirable influence of the lowering of the article against the sheet on the upstream part of the sheet can also be eliminated by another embodiment of the invention as illustrated in FIGS. 6 through 10, wherein the sheet S is fed intermittently onto the surface of water W.

Figure 6:
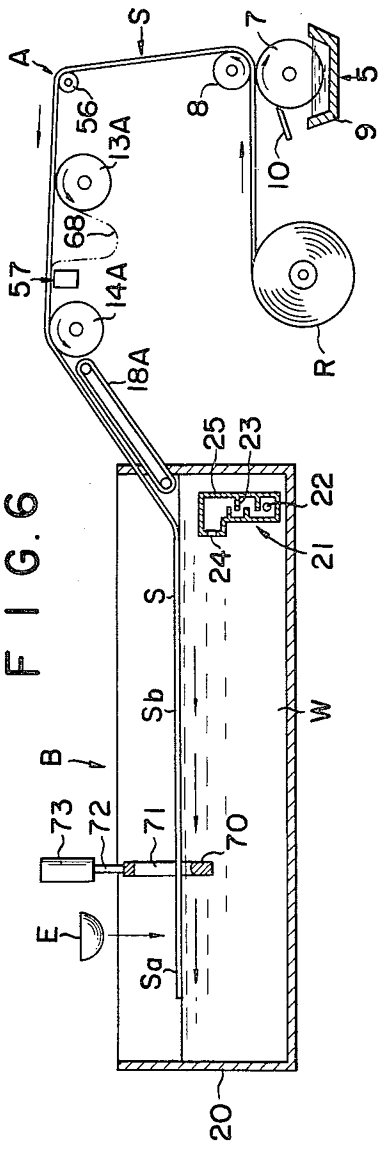
FIG. 6 is a schematic side elevation, with some parts in vertical section, showing another embodiment of the invention.

Referring to FIG. 6, the printing pattern support sheet S is passed through the solvent coating device 5, a guide roll 56 and a constantly driven delivery conveyer 18A onto the surface of water W. Between the guide roll 56 and the delivery conveyer 18A there are disposed a pair of parallel suction rolls 13A and 14A, and a suction bar 57 is stationarily provided between the suction rolls at a position nearer to the downstream suction roll 14A. The suction bar 57 is fixedly mounted on a structural frame not shown and is in the form of a hollow square bar member with the upper surface thereof in contact with the span of the sheet S between the two suction rolls.

Figure 7:
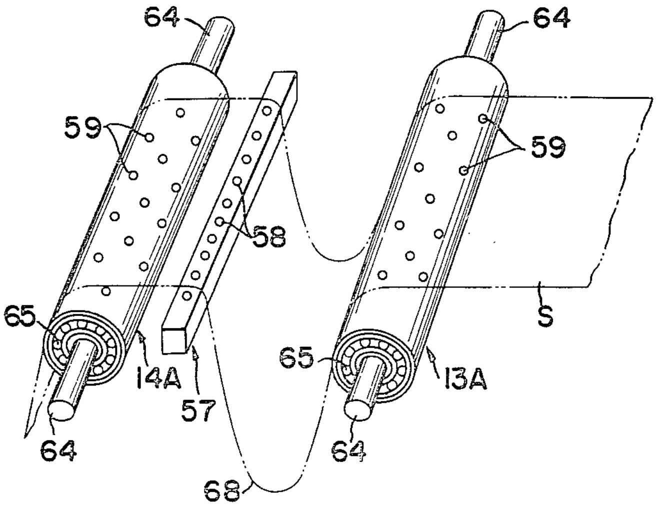
FIG. 7 is an enlarged perspective view showing suction rolls and a suction bar used in the apparatus shown in FIG. 6.

As shown in more detail in FIG. 7, the upper surface of the suction bar 57 is formed with a number of suction holes 58 or slits communicating with the hollow interior of the bar, which interior is connected to a vacuum source not shown. The suction rolls 13A and 14A are also formed with a number of suction holes 59 or slits in the peripheral surfaces thereof.

Figure 8:
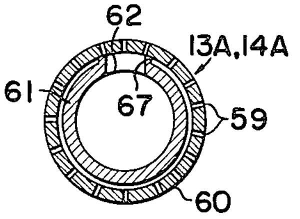
FIG. 8 is a cross section of one of the suction rolls shown in FIG. 7.
Figure 9:
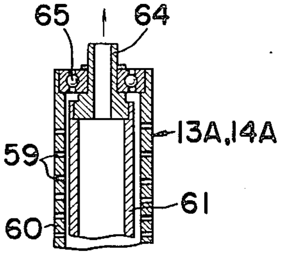
FIG. 9 is a fragmentary longitudinal section of one of the suction rolls.

With reference to FIGS. 8 and 9, each of the suction rolls 13A and 14A comprises an outer cylinder 60 having the above mentioned suction holes 59, and an inner cylinder 61 having a slot 62 formed in the longitudinal direction thereof. The inner cylinder 61 is fixedly supported at its two ends by means of stationary support shafts 64, and the hollow interior of the inner cylinder 61 communicates by way of one of the shafts 64 with the above mentioned vacuum source. The outer cylinder 60 is rotatably mounted at its two ends on the support shafts 64 by means of bearings 65. Although not shown in FIGS. 6 and 7, the suction rolls 13A and 14A are driven in rotation in the same manner as the suction rolls 13 and 14 shown in FIG. 1. The above mentioned slot 62 is formed in the uppermost part of the inner cylinder 61 and always faces upward as shown. The rim of the slot 62 has an upwardly projecting flange 67 which is in sliding contact with the inner surface of the outer cylinder 60.

The operations of the suction rolls and bar are controlled in timed relation in the following manner. While the suction rolls 13A and 14A are being rotated to feed the sheet S forward, the suction bar 57 is not operated to suck the sheet. When the suction rolls have fed the sheet by a distance such that the most downstream portion of the sheet arrives at the position for the transfer printing, a valve provided between the downstream suction roll 14A and the vacuum source is closed automatically to stop the sucking operation of the suction roll, while the upstream suction roll 13A remains connected to the vacuum source. At the same time, a valve provided between the suction bar 57 and the vacuum source is opened to subject the suction bar 57 to vacuum, whereby the feed of the sheet S is stopped in the region downstream from the suction bar 57 with the portion of the sheet on the suction bar in a state of being sucked and held stationary by the suction bar 57. As a consequence, the sheet is slackened, at 68 as shown in FIGS. 6 and 7 between the suction roll 13A and the suction bar 57 since the upstream suction roll 13A continues to feed the sheet.

While the feed of the sheet is being stopped in the region downstream from the suction bar 57, the most downstream portion of the sheet floating on the water is held stationary, and the transfer printing operation is carried out during this period with this portion of the sheet.

After the printing operation has been finished, the downstream suction roll 14A is again connected to the vacuum source and the suction bar 57 is disconnected from the vacuum source, whereby the feed of the sheet into the tank 20 is started again and the slackened portion 68 of the sheet disappears.

The delivery conveyer 18A comprises an endless belt passed around driving and driven rollers. The driving roller should preferably be stopped while the downstream suction roll 14A and the suction bar 57 are being connected to the vacuum source. However, the driving roller may continue to drive the endless belt during this period. In this case, slip will occur between the sheet and the delivery conveyor. It will be understood that a delivery plate as shown at 18 in FIG. 1 may also be used in place of the delivery conveyor 18A.

The outer cylinders 60 of the suction rollers 13A and 14A are driven at a peripheral speed greater than that of the cylinder 7 of the solvent coating device 5. This is for the purpose of taking up the above mentioned slack of the sheet S and of imparting proper tension to the sheet to ensure smooth feed of the same after the slack has been taken up. It will be understood that while the suction rolls feed the sheet forward, some slip occurs between the suction rolls and the sheet.

As stated hereinbefore, the stationary inner cylinder 61 of each suction roll has the upwardly directed air sucking slot 62, which sucks air downwardly only through the suction holes 59 passing immediately above the slot 62. This means that although each suction roll has the suction holes 59 in the entire peripheral surface thereof, it sucks air only at its uppermost portion of the peripheral surface. It will be understood that as only the uppermost portion of each suction roll sucks the lower surface of the sheet being fed, the sheet is caused to pass over the suction rolls smoothly, and undesirable deformation of the printed pattern on the upper surface of the sheet is prevented.

Figure 10:
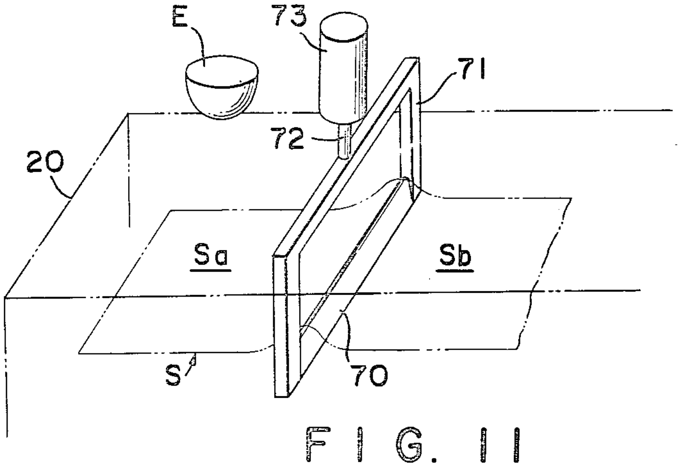
FIG. 10 is an enlarged perspective view showing a sheet raising member used in the apparatus illustrated in FIG. 6.

According to this embodiment of the invention, a single sheet raising member 70 is provided in the tank 20 as shown in FIG. 6. The sheet raising member 70 is in the form of a horizontal bar extending transversely of the tank 20, as shown in FIG. 10, and is normally disposed below the surface of the water W at a position immediately upstream of the transfer printing position Sa. The sheet raising member 70 is rigidly secured at the two ends thereof to an inverted U-shaped support member 71 which is in turn fixedly secured to the lower end of a piston rod 72 of a pneumatic cylinder 73 mounted over the tank 20 by any suitable supporting means.

The pneumatic cylinder 73 is operated in timed relationship with the intermittent feed of the sheet as above described, with the use of a timer or by signals sent from the device for controlling the intermittent feed. More specifically, when the sheet is being fed in the region downstream of the suction bar 57, the cylinder 73 is so operated that the raising member 70 is below the water level and clear of the sheet floating on the water, while when the feed of the sheet is being stopped in the tank 20, the cylinder 73 is so operated as to lift the raising member 70 and hence the sheet slightly above the water level as shown in FIG. 10, whereby the part Sb of the sheet upstream of the raising member 70 is completely isolated from the part Sa of the sheet in the transfer printing position. It will be understood that the lowering of the article E against the part Sa of the sheet for the transfer printing will not disturb the part Sb because of the isolating function of the raising member 70.

It is desirable that the flow of water in the tank 20 be stopped during the stoppage of the feed of the sheet in the tank. To this end, the operation of the water flow generating device 5 may be stopped by stopping the operation of the pump for supplying water into the device 5. Alternatively, the chamber 25 of the device may be tilted so that the outlet 24 is directed toward the bottom of the tank. To this end, the chamber 25 is pivotally supported in the tank to enable the tilting movement thereof by any motive means such as a pneumatic cylinder.

Figure 11:
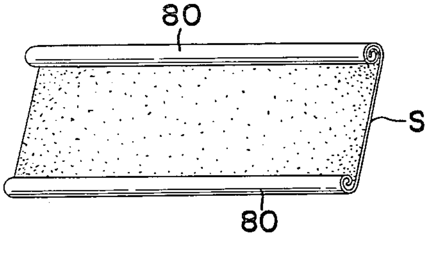
FIG. 11 is a perspective view of a printing pattern support sheet, showing how the lateral edges of the sheet is curled.

It has been found that the sheet S in the form of a strip tends to curl at the lateral edges thereof as indicated at 80 in FIG. 11, as soon as it reaches the surface of water W in the tank. It is apparent that this causes difficulties in carrying out the transfer printing. The curls 80 normally disappear as the liquid-soluble thin film of the sheet dissolves and swells in the liquid or water W, but this takes a long time. Moreover, the curls sometimes remain partially even after the elapse of an appreciable time.

Figure 12:
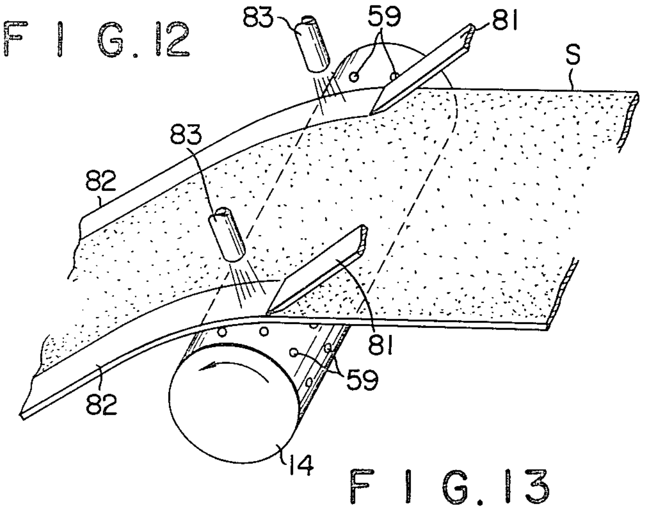
FIG. 12 is a perspective view showing a device for preventing formation of curls at the edges of the sheet.

In order to solve the above stated problems, measures can be taken as illustrated in FIG. 12. As shown therein, scraper blades 81 are adjustably mounted above the downstream suction roll 14 in a manner such that the lowermost sharp edges thereof are in engagement with the respective side edge portion of the sheet. The sharp edges of the scraper blades 81 cooperate with the peripheral surface of the suction roll 14 to press the side edge portions of the sheet against the roll 14. It will readily be understood that as the sheet is fed forward on the suction roll, the sharp edges of the scraper blade 81 rub off the ink pattern on the thin film along the respective side edges of the sheet.

It is to be understood that the scraper blades 81 may be installed in other positions, for example, above the side edges of the delivery plate 18 or above the end parts of the inverting roll 11, which were described hereinbefore in connection with FIG. 1. The scraper blades 81 may be made of a synthetic resin, rubber or metal.

The scraper blades 81 may be replaced by scraper members of any other form, such as scraper rolls. When scraper rolls are used, the peripheral speed of the scraper rolls is made different from that of the other members, such as the suction rolls 14, cooperating with the scraper rolls, so that scraping or rubbing action can be obtained.

The material of the pattern rubbed off by the scraper blades 81 is accumulated in the region immediately upstream thereof. The accumulated material can be removed by means of suction tubes not shown.

Figure 13:
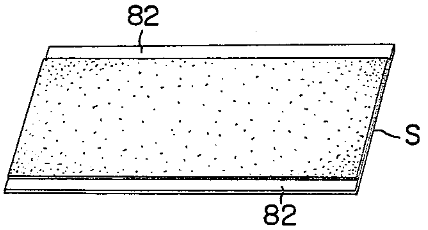
FIG. 13 is a perspective view showing a sheet without curls.

The sheet S subjected to the operation of the scraper blades is caused to have side edge portions 82 in which the liquid-soluble thin film has no ink pattern thereon, and the sheet in this condition is fed forward and caused to float on the surface of water W without curls at the side edge portions 82 as indicated in FIG. 13.

The reasons why the formation of curls is prevented by removing the ink pattern on the side edge portion of the sheet are considered to be as follows. As the sheet is brought in contact with the liquid, the liquid-soluble thin film of the sheet swells and is elongated to a considerable degree, so that differential elongation between the thin film and the ink pattern occurs and causes the formation of the curls. However, in the case where the ink pattern does not exist on the side edge portions of the sheet, no differential elongation can occur in that portions, and as a result the formation of the curls is prevented. Moreover, the surface tension in the water tending to attract the side edge portions of the sheet toward the water level can cause the sheet edge portions to deform more easily without the pattern in those portions than with the pattern remaining in those portions.

Even with the use of the scraper blades 81, the thin film sometimes still tends to curl in the side edge portions immediately after the contact of the sheet with the liquid. In such a case, nozzles 83 may be installed at a position downstream from the scraper blades 81 and upstream from the region where the sheet begins to swell as a result of contact with the liquid, to eject the liquid on the surface of the sheet so as to cause the sheet to swell preliminarily before it is brought into contact with the liquid. The preliminary supply of the liquid to the side edge portions of the sheet may be carried out by means of liquid application rolls not shown.

The printing pattern support sheet S has the ink pattern coated over the entire breadth of the liquid-soluble film, and in order to apply the solvent to the entire breadth of the same for activating the pigment and resin constituting the ink pattern, the gravure printing surface, or the surface portion to which the solvent is to be applied, of the plate cylinder 7 must have a breadth somewhat greater than the breadth of the sheet S.

In the embodiment of the invention shown in FIG. 1, the impression cylinder 8 is of the same length as the plate cylinder 7. With this construction, the end parts of the surface of the plate cylinder 7 projecting beyond the breadth of the sheet is in substantial rolling contact with the opposing parts of the surface of the impression cylinder 8, so that the solvent applied to the surface of the plate cylinder 7 is transferred to the surface of the impression cylinder 8, and, as a result, the solvent on the impression cylinder 8 reaches the opposite surface of the sheet to which the solvent is not to be applied and which is to become the lower surface of the sheet when the sheet is floated on the liquid in the tank 20.

This is undesirable for the following reasons. If the solvent adheres to the surface of the sheet opposite to its surface to which printing pattern is applied, the solvent will be transferred and adhere to the rolls 11, 12, 13 and 14 and to other parts of the apparatus, and this prevents smooth and reliable printing operation of the apparatus. The most harmful effect of the solvent adhering to the opposite surface of the sheet is that when the sheet is brought into the state of floatation on the liquid, the liquid-soluble film thereof is prevented from contacting the liquid because of the intervening solvent, and, as a consequence, the swelling of the film necessary for the transfer printing is delayed, caused to occur partially or locally, or completely prevented in the worst case.

Figure 14:
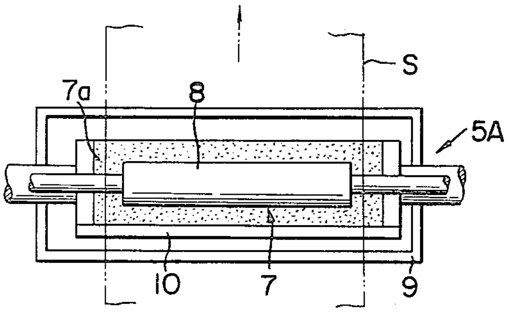
FIG. 14 is a plan view showing a modified solvent coating device.
Figure 15:
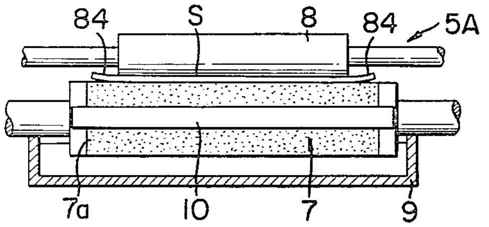
FIG. 15 is an elevation of the modified solvent coating device.

The above stated problem can be solved by the use of a modified solvent coating device 5A as illustrated in FIGS. 14 and 15. According to this modification, the impression cylinder 8 is made shorter than the plate cylinder 7 and shorter than the breadth of the sheet S. It will be noted that the breadth of the sheet is intermediate between the lengths of the impression and plate cylinders 8 and 7. The plate part of the plate cylinder 7 is shown at 7*a* and has a breadth somewhat greater than the breadth of the sheet S.

As a result, the sheet S warps slightly upwardly at its side edge portions 84 while it is passed under pressure between the plate and impression cylinders 7 and 8, whereby the solvent adhering to the plate part of the cylinder 7 is prevented from being transferred to the opposite surface of the sheet and to the impression cylinder 8. It is to be noted that although the sheet warps, the amount of the warp is so small that the solvent on the plate cylinder 7 can reach the surface of the sheet. As mentioned hereinbefore, the suction rolls as shown at 13 and 14 exert tension on the sheet being fed. The warping of the sheet is promoted also by this tension.

In the modified form illustrated in FIGS. 14 and 15, the impression cylinder 8 is made shorter than the plate cylinder 7, but the impression cylinder 7 may be made equal in length to the plate cylinder 7 and be formed with end portions converging toward the ends or having reduced diameters. It will be understood that the converging end portions or the reduced-diameter end portions are spaced apart from the surface of the plate cylinder 7 and do not touch the same, thus preventing transfer of the solvent from the plate cylinder 7 to the impression cylinder 8.

In accordance with this invention, there is further provided means for preventing any wrinkling of the printing pattern support sheet S due to swelling thereof when it contacts the surface of the liquid in the tank.

Figure 16:
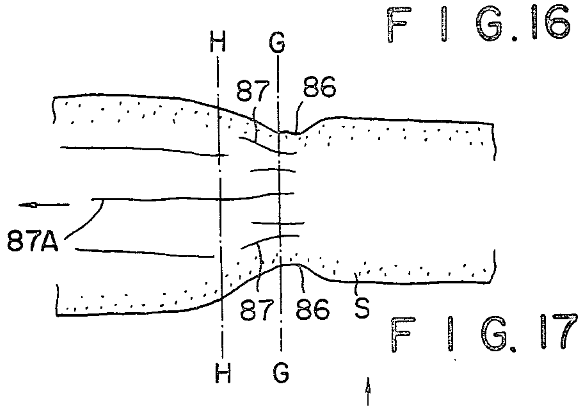
FIG. 16 is a plan view of a printing pattern support sheet, showing how wrinkles are formed thereon.

Upon being sent from the sheet feeding device A as shown in FIG. 1 and contacting the surface of the liquid in the tank 20, the thin film of the sheet S has a tendency to swell suddenly, as described hereinbefore. As a result, the thin film of the sheet acquires a constriction 86, as indicated in FIG. 16, in the part thereof after contact with the liquid, whereby a large member of wrinkles 87 are formed in the inner part of the sheet in the direction of its advance. The formation of these wrinkles 87 may be attributed to the abrupt spreading of the sheet due to the swelling of the thin film. Then, since the sheet is traveling, a number of these wrinkles continue to exist up to the transfer position as at 87*a*. The adhesiveness of the activated pattern on the sheet further contributes to this persistence of these wrinkles.

The formation of these wrinkles becomes more conspicuous with increased sheet width. If these wrinkles persist up to the transfer position, they will give rise to a distortion of the pattern, which will then be useless for transfer. As measures for preventing the formation of these wrinkles, it is a common practice to reduce the speed of the flow of the liquid or to vary the flow thereof. These methods, however, are not desirable since they require complications in the mechanism of the liquid flow generating device 21.

This invention, in one aspect thereof, overcomes this difficulty by forcing parts of the sheet at several points into the liquid or water by means of air jets when the sheet contacts the surface of the liquid and begins to swell thereby to prevent formation of wrinkles and ensure satisfactory transfer.

Figure 17:
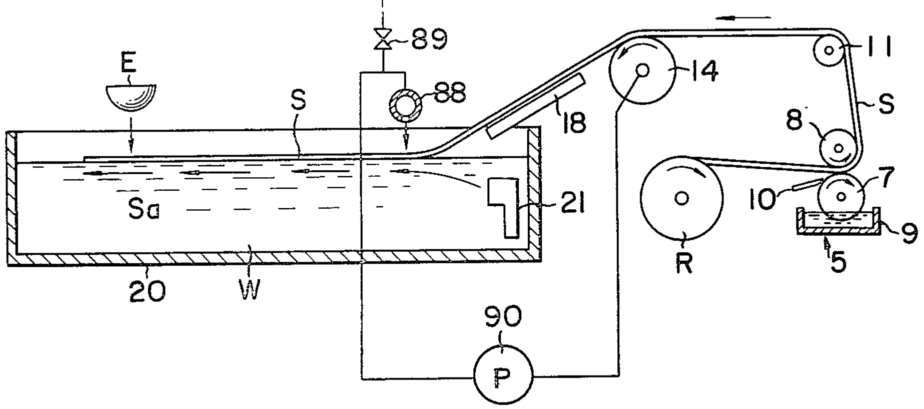
FIG. 17 is a schematic elevation of a modified apparatus according to this invention wherein the formation of wrinkles on the sheet can be effectively prevented.
Figure 18:
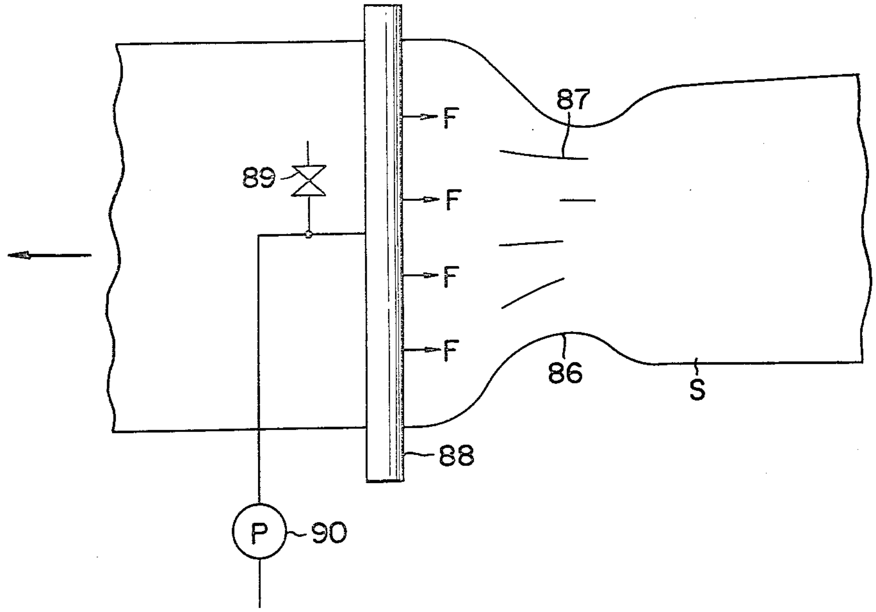
FIG. 18 is a fragmentary plan view, on an enlarged scale, showing essential elements of the apparatus shown scale, showing essential elements of the apparatus shown in FIG. 17.

Ine one example of apparatus having means which make this feature possible is schematically shown in FIGS. 17 and 18. The sheet S is paid out from the roll R and passed through the solvent coating device 5, over the inverting roll 11, the suction roll 14 and the delivery plate 18, into the tank 20. In order to prevent the formation of wrinkles 87, 87A, ejected air F is applied at a number of local points along the transverse direction of the sheet S, the air F being directed toward the part of the sheet where it swells on the liquid surface and expands. More specifically, this ejected air F is applied along the chain line G or the chain line H as shown in FIG. 16, or some line therebetween. The sheet S is thereby caused to undergo a waving motion and thus be stretched by the air stream F. As a result, formation of wrinkles is prevented.

The above described ejected air F can be ejected from a nozzle pipe 88 comprising a pipe provided with a large number of small holes. This nozzle pipe 88 is communicatively connected by way of a suction pump 90 to the aforementioned suction roll 14 and is supported above the tank 20. An air delivery control valve 89 is installed between the pump P and the nozzle pipe 88.

Thus, the exhaust air from the suction roll 14 is ejected through the nozzle pipe 88 toward the upper surface of the sheet S at the chain lines G and H, thereby causing undulating waves in the sheet S and causing the sheet to stretch, whereby wrinkles therein are removed. The control valve 89 is adjusted in accordance with the degree of removal of the wrinkles 87A.

The nozzle pipe 88 may be a pipe provided with slits instead of holes, or it may be a pipe having a number of small pipes in which nozzles available on the market are installed.

The sheet S in which the formation of wrinkles has been prevented in the above described manner is fed to the transfer position Sa as shown in FIG. 17 for the transfer printing operation.

Figure 19:
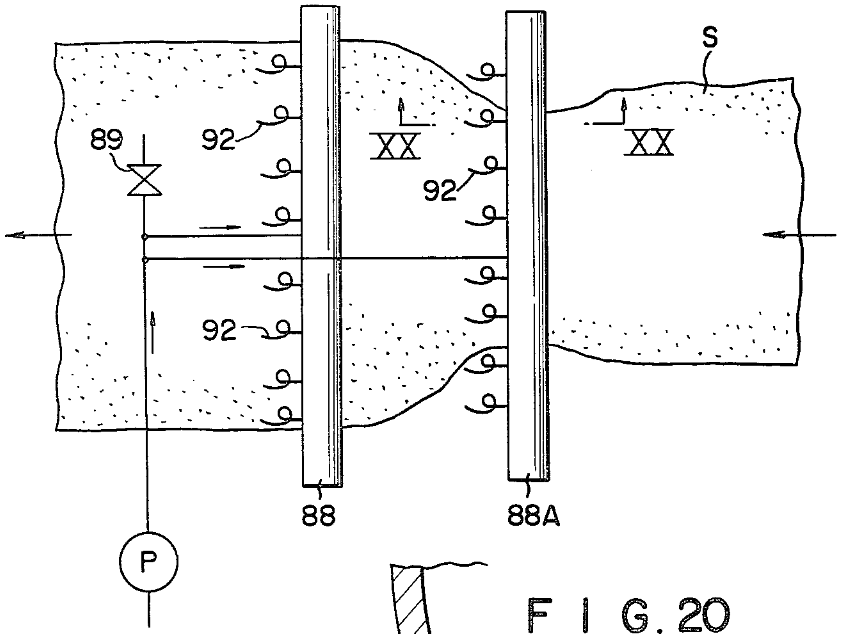
FIG. 19 is a view similar to FIG. 18 but showing a modification.

In the device for preventing the formation of wrinkles as shown in FIG. 19, an additional nozzle pipe 88A is provided upstream from and in parallel relationship to the nozzle pipe 88. Each of these nozzle pipes 88 and 88A supports a series of nozzles 92 disposed along the length thereof over the entire breadth of the sheet S to eject air to the surface of the sheet.

Figure 20:
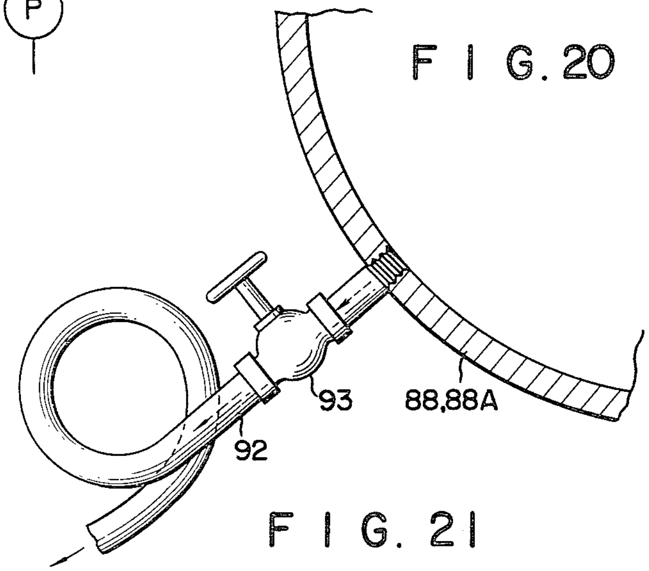
FIG. 20 is a cross section, on an enlarged scale, taken along line XX—XX in FIG. 19.

As shown in FIG. 20, each nozzle 92 is preferably in the form of a looped pipe made of deformable material such as copper or aluminium. The nozzle 92 is connected at its proximal end to the nozzle pipe 88 or 88A and has a valve 93. Since the nozzles 92 are made of deformable material, they can be manually deformed so that their outlets are oriented in appropriate directions to eject air to intended positions on the surface of the sheet. The flow rate of air to be ejected from each nozzle 92 can be adjusted by means of the valve 93.

Figure 21:
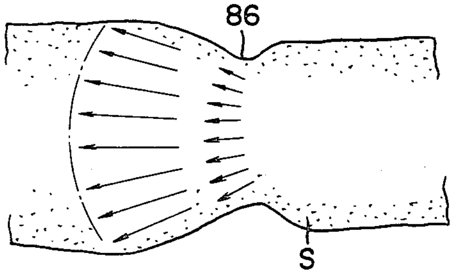
FIG. 21 is a plan view showing a printing pattern support sheet floating on a liquid, the view being explanatory of how air flows are distributed to prevent formation of wrinkles.

The directions and flow rates of air to be ejected from the nozzles 92 as well as the positions to which air is to be ejected are indicated in FIG. 21. It will be noted that air is ejected in the direction of feed of the sheet in the central region thereof, and in the direction somewhat outwardly deviated toward the side edges of the sheet in the outer region thereof, and that the flow rate of air is decreased toward the side edges of the sheet. It will also be noted that the air is ejected in the region of the construction 86 and in the region somewhat downstream therefrom.

As described hereinbefore with reference to FIG. 3, the water flow generating device 21 is necessary to generate flow on the surface of water in the tank 20 so as to cause the sheet floating on the water to move toward the transfer printing position. This water flow generating device 21 is illustrated in FIG. 22 in perspective view. It will be seen that the slit 24 extends over the entire width of the chamber 25.

A modified form of the water flow generating device is illustrated in FIGS. 23 and 24 and generally designated by 21A. The device 21A comprises a box-like chamber 25A and a pipe 94 which is connected to the delivery side of a pump not shown to be supplied with liquid or water. The chamber 25A is formed with a transverse slit 24A and provided with deflectors 23A therein. Additional pipes similar to the pipe 94 may be installed, all these pipes being connected to a common pump.

FIGS. 25 and 26 illustrate a further modified form of the water flow generating device. The device shown therein is designated by 21B and is of a weir type. The device 21B comprises an open-top receptacle 95 into which water is supplied via a pipe 94B. One side wall of the receptacle 95 is made lower than the other side wall and formed into a weir 96 to which is connected a downwardly sloping trough 97 having upstanding side walls 98. It will be understood that water supplied into the receptacle 95 overflows the weir 96 and flows down the through 97 into the tank 20 to generate water flow on the surface of water in the tank 20.

Figure 27:
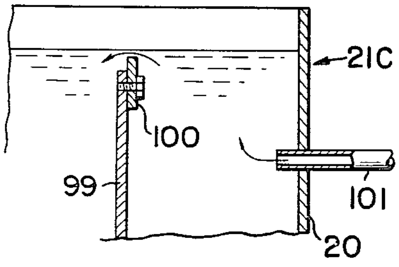
FIG. 27 is a fragmentary vertical section of a still further modified form of the liquid flow generating device.
Figure 28:
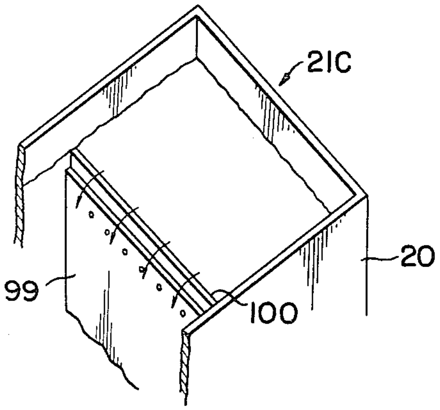
FIG. 28 is a perspective view of the device shown in FIG. 27.

In a still further modified form of the device generally designated by 21C in FIGS. 27 and 28, the water tank 20 is provided therein with a partition wall 99, and on the top edge thereof is secured a weir plate 100 in a manner affording adjustment of its height. Water supplied in the space between the partition wall 99 and the end wall of the tank 20 by way of a conduit 101 overflows over the upper edge of the weir plate 100 to generate water flow in the tank.

As described hereinbefore, the thin film constituting the printing pattern support sheet suitable for use in the present invention should swell on the liquid to a sufficient degree, possess multi-color printability, and be able to closely conform to the curved surface of the article being transfer printed.

Such a film may be prepared from the following materials: dextrin, gelatin, glue, casein, shellac, gum arabic, starch, protein, polyvinyl alcohol, polyacrylic amide, polysodium acrylate, polyvinyl methyl ether, a copolymer of methyl vinyl ether and maleic anhydride, a copolymer of vinyl acetate and itaconic acid, polyvinyl pyrrolidone, cellulose and its derivatives such as acetylcellulose, acetylbutylcellulose, carboxymethyl cellulose, methyl cellulose and hydroxyethyl cellulose, and sodium alginate. These materials may be used singly or in combination. The thin film has a thickness of from 10 to 100μ, preferably from 20 to 60μ.

It is most practical to use water as the liquid in which transfer printing is carried out. Accordingly, in this case, it is desirable to use a water-soluble film as the thin film. Preferred examples of such a film are a starch film, a polyvinyl alcohol film, a polyvinyl alcohol-starch mixture film, and a coated or laminated film which comprises a liquid permeable base, such as paper, nonwoven fabric and various porous films, coated or laminated with the above mentioned materials.

When one surface of the above mentioned film is to be multi-color printed to form a printing pattern, use is made of inks which adhere to the film temporarily, form a dried coating with ease, adhere to the surface of the article being transfer printed, and contain a resin as a vehicle which is easily swollen when applied with the solvent as mentioned hereinbefore. Such inks may be conventional inks each prepared by adding to an ink or paint vehicle a coloring agent such as dyes or pigments and, optionally, conventional additives such as plasticizers, stabilizers, waxes, greases, dryers, auxiliary dryers, hardners, thickners, dispersing agents and fillers, and milling intimately the resultant mixture with a solvent or diluent.

Suitable examples of the vehicle for use in the above mentioned inks are oils and fats such as linseed oil, soybean oil, and synthetic drying oils; natural or modified resins such as rosin, copal, dammar, hardened rosin, rosin esters and polymer rosin; synthetic resins such as rosin-modified phenol resins, 100% phenol resin, maleic acid resin, alkyd resins, petroleum resins, vinyl resins, acrylic resins, polyamide resins, epoxy resins, and aminoalkyd resins; cellulose derivatives such as nitrocellulose and ethyl cellulose; rubber derivatives such as rubber chloride and cyclized rubber and other materials such as glue, casein, dextrin and zein.

The pattern on the thin film of the sheet may be produced by using the above described inks according to known procedures such as printing techniques, for example, gravure printing, lithographic printing, letter press and screen printing; coating techniques, for example, brushing, knife coating and spray coating, and picturing techniques, for example, hand painting and brush painting. By using the above mentioned techniques, it is possible to provide multi-color regions as desired such as letters, figures, symbols, and designs.

With the dry inks on the film, the sheet is fed and the inks are allowed to swell with the application of the solvent capable of swelling the printed inks immediately before they are transfer printed, and they are then allowed to float on the liquid and transferred onto the article, as described hereinbefore. The application of the solvent to the pattern support sheet may be carried out by gravure coating, offset gravure coating, roll coating, bar coating, spray coating or supersonic coating. The solvent is applied with a coverage of from 2 to 30 g/m$^2$, preferably from 3 to 15 g/m$^2$. It is desirable that the solvent capable of swelling the inks used in multi-color printing do not dissolve the inks, evaporate before the inks are transferred, attack the surface of the article being transfer printed, and rapidly dissolve an undercoating of paint, which the article to be transfer printed may have thereon, when the solvent contacts the paint.

Examples of such a solvent are aliphatic hydrocarbons such as pentane, hexane, heptane, octane, gasoline consisting of a mixture of these materials, petroleum, benzine, mineral spirit and petroleum naphtha; aromatic hydrocarbons such as benzene, toluene, xylene, cyclohexane, and ethylbenzene; halogenated hydrocarbons such as trichloroethylene, perchloroethylene, chloroform and carbon tetrachloride; monohydric alcohols such as methyl alcohol, ethyl alcohol, propyl alcohol, butyl alcohol, amyl alcohol, and benzyl alcohol, diacetone alcohol; polyhydric alcohols such as ethylene glycol, propylene glycol and glycerin; ketones such as acetone, methyl ethyl ketone, methyl isobutyl ketone, cyclohexanone, methylcyclohexanone and isophorone; ethers such as ethyl ether, isopropyl ether, ethylene glycol, monomethyl ether, ethylene glycol monoethyl ether, diethylene glycol mono-methyl ether; ethylene glycol mono-methyl ether acetate, ethylene glycol monoethyl ether acetate, diethylene glycol monomethyl ether acetate, diethylene glycol mono-ethyl ether acetate, diethylene glycol mono-butyl ether acetate; esters such as acetic acid esters, and butyric acid esters; nitro hydrocarbons; nitriles; amines; acetals; acids; and furans. These solvents may be used singly or in combination.

A resin having an affinity for the above mentioned solvents may also be added to the solvents.

Examples of such a resin are thermoplastic resins which are homopolymers or copolymers of monomers such as halogenated vinyl monomers such as vinyl chloride and vinylidene chloride; styrene and its derivatives; vinyl ester monomers such as vinyl acetate; allyl alcohol and allyl esters; unsaturated carboxylic acids such as acrylic acid, methacrylic acid, itaconic acid, crotonic acid, maleic acid and fumaric acid; ester, nitrile and acid amide derivatives of the above mentioned unsaturated carboxylic acids; N-methylol- and N-alkylmethylol ether derivatives of the acid amide derivatives of the above mentioned unsaturated carboxylic acids; glycidyl acrylate, glycidyl methacrylate, allyglycidyl ether, vinyl isocyanate, allyl isocyanate, 2-hydroxyethyl-acrylate or -methacrylate, 2-hydroxypropylacrylate or -methacrylate, ethylene glycol mono-acrylate or -methacrylate, ethylene glycol di -acrylate or -methacrylate, maleic anhydride, itaconic anhydride, methyl vinyl ketone, butadiene, ethylene, propylene, dimethylaminoethyl methacrylate, vinyl pyridine, tert-butylaminoethyl methacrylate, and monoallyl ethers of polyhydric alcohols; thermosetting resins such as polyamide resins; polyester resins; phenol resins, melamine resins, urea resins, epoxy resins, diallyl phthalate resin, silicon resins and polyurethane resins and their modified resins or initial condesates; natural resins; rosin and its derivatives; cellulose derivatives; natural or synthetic rubber; and petroleum resins. Addition of such resin or resins in a quantity of 5 to 60% by weight to the solvent affords facilitation of adjustment of the viscosity of the solvent, the possibility of using any type of coating technique, extension of the ink retention time of the solvent, lengthening of the transferring time.

The liquid in which the transfer printing is carried out is adjusted to a suitable temperature depending upon the property of the film of the pattern support sheet. For example, when water is used as the liquid and a starch film (trade name, Oblate) is used as the film, the temperature of the water should desirably be of the order of 40° to 50° C. Also, when the starch film is used as indicated above, it is preferable to add amylase in a quantity of about 2 to 4% to the film in order to promote the dissolution of the film when it is removed.

After the printed inks are strongly fixed to the surface of the article which has been thus transfer printed and the thin film is removed, the article is taken out of the liquid. The surface of the article is then adequately cleaned, and the article is thereafter dried. The thin film may be removed by any appropriate method. For example, the thin film may be peeled from the surface of the article or it may be dissolved away. When a water-soluble film is used, it is the most efficient and preferable method to wash the article thus transfer printed with a water shower. By doing so, the thin film adhering to the article is completely removed, and, at the same time, contaminants accumulated during the transfer printing are washed away. In this case, the water temperature is suitably in the range of 15° to 60° C., in general although it varies with the properties of the film used. The washing time is of the order of 1 to 10 minutes.

What is claimed is:

1. A method for transfer printing on an article comprising the steps of: preparing a printing pattern support sheet made-up of a film soluble in a liquid and a pattern preprinted on one surface of film; applying a solvent to said pattern thereby to activate the pattern into an adherent condition ready for printing; feeding the sheet towards a position for transfer printing on the free surface of a mass of said liquid, the film of the sheet thereby contacting and floating on the free surface; causing the film of the sheet to gradually dissolve in the liquid, while being fed toward said position, to leave the pattern on the free surface of the liquid; isolating the part of the sheet in said position from the other part of the sheet, which is being fed toward said position, by raising the sheet, by means of a bar located below the sheet, above the surface of the liquid between said parts; and moving the article against the pattern floating on the free surface in said position and into the liquid to transfer the pattern onto the article.

2. The method as claimed in claim 1, wherein the printing pattern support sheet is fed in the form of a strip.

3. The method as claimed in claim 1, further comprising the step of generating a flow of said liquid on the free surface thereof to move the printed pattern supporting sheet floating thereon to a place for transfer printing where the film of the sheet has almost completely dissolved in the liquid.

4. The method as claimed in claim 1, wherein a further printing is made on said one surface of the film as the solvent is applied to the pre-printed pattern.

5. The method as claimed in claim 2, wherein said printed pattern support sheet is stored in the form of a roll of strip and paid out therefrom for feeding.

6. The method as claimed in claim 1, wherein the sheet is fed on the free surface of the liquid in the form of separate sheet elements.

7. The method as claimed in claim 2, further comprising the step of interrupting the feeding of the sheet while the article is moved against the pattern for transfer printing.

8. The method as claimed in claim 1, further comprising the step of removing the printed pattern from the film along the two side edges of the sheet in the direction of the feed of the latter, before the sheet is fed to the surface of the liquid.

9. The method as claimed in claim 9, further comprising the step of ejecting said liquid to said side edges of the sheet before the sheet is fed to the surface of the liquid.

10. The method as claimed in claim 1, further comprising the step of ejecting air onto the sheet over the entire width thereof in the region where the sheet is brought in contact with the surface of the liquid.

11. The method as claimed in claim 1, wherein said pattern comprises at least one ink, and said solvent is applied by applying to said pattern a swelling liquid comprising said solvent, which functions to cause said ink to swell.

12. The method as claimed in claim 1, wherein said liquid is water, and said film is a water-soluble film.

13. The method as claimed in claim 12, wherein said swelling liquid consists of only a solvent which causes said at least one ink to swell.

14. The method as claimed in claim 11, wherein said swelling liquid comprises a solvent for causing said ink to swell and a resin having affinity with respect to said solvent.

15. The method as claimed in claim 14, wherein said swelling liquid contains said resin in a quantity of 5 to 60 percent by weight.

* * * * *